US012411299B2

(12) United States Patent
Anderson et al.

(10) Patent No.: US 12,411,299 B2
(45) Date of Patent: Sep. 9, 2025

(54) HIGH FIBER DENSITY CABLE WITH FLEXIBLE OPTICAL FIBER RIBBONS

(71) Applicant: Prysmian S.p.A., Milan (IT)

(72) Inventors: Clint Nicholaus Anderson, West Columbia, SC (US); Jeffrey Scott Barker, Stony Point, NC (US); Brian G. Risch, Granite Falls, NC (US); Ryan Truong, Hickory, NC (US); Ben H. Wells, Columbia, SC (US); Gavin Lin, Lexington, SC (US); Donald Ray Parris, Lexington, SC (US)

(73) Assignee: Prysmian S.p.A., Milan (IT)

( * ) Notice: Subject to any disclaimer, the term of this patent is extended or adjusted under 35 U.S.C. 154(b) by 183 days.

(21) Appl. No.: 17/868,498

(22) Filed: Jul. 19, 2022

(65) Prior Publication Data

US 2024/0027714 A1    Jan. 25, 2024

(51) Int. Cl.
*G02B 6/44* (2006.01)

(52) U.S. Cl.
CPC .......... *G02B 6/4403* (2013.01); *G02B 6/4411* (2013.01); *G02B 6/4432* (2013.01); *G02B 6/4434* (2013.01)

(58) Field of Classification Search
CPC .. G02B 6/4403; G02B 6/4411; G02B 6/4432; G02B 6/4434

(Continued)

(56) References Cited

U.S. PATENT DOCUMENTS

| 5,740,295 A | 4/1998 | Kinard et al. |
| 2003/0044139 A1* | 3/2003 | Norris ................. G02B 6/4429 |
| | | 385/113 |

(Continued)

OTHER PUBLICATIONS

Tsukamoto, Masayoshi et al., "Ultra-High Density Optical Fiber Cable with Rollable Multicore Fiber Ribbon," The 23rd OptoElectronics and Communications Conference (OECC 2018) Technical Digest, Jul. 2-6, 2018, Jeju, Korea, 2 pages.

(Continued)

*Primary Examiner* — Jerry M Blevins
(74) *Attorney, Agent, or Firm* — Slater Matsil, LLP

(57) ABSTRACT

An exemplary optical cable includes a first type of ribbon bundles, a second type of ribbon bundles, a third type of ribbon bundles, a plurality of strength rods, and an outer jacket. Each of the first, the second, and third type of ribbon bundles includes a first, a second, a third flexible ribbon with corresponding optical fibers disposed within a ribbon bundle jacket. The first type of ribbon bundles is arranged in an interlocking pattern in a central region of the optical cable. The second type of ribbon bundles and the third type of ribbon bundles are disposed around the first type of ribbon bundles in a peripheral region of the optical cable. The outer jacket is disposed around the second and the third type of ribbon bundles, and the plurality of strength rods being at least partially embedded in the outer jacket, where the cumulative cross-sectional area of all of the strength rods in the cable divided by the cumulative cross-sectional area of all glass parts of the optical fibers in the cable is a first value (Continued)

less than 0.22, and where, at a temperature between −40° C. and 0° C. and at a wavelength of 1550 nm, the attenuation increase of the optical fibers in the cable relative to 25° C. is below 0.15 dB/km.

22 Claims, 11 Drawing Sheets

(58) Field of Classification Search
USPC .......................................................... 385/114
See application file for complete search history.

(56) References Cited

U.S. PATENT DOCUMENTS

| | | | | |
|---|---|---|---|---|
| 2004/0086242 A1* | 5/2004 | McAlpine | ............ | G02B 6/4431 |
| | | | | 385/102 |
| 2015/0346445 A1* | 12/2015 | Blazer | .................. | G02B 6/4405 |
| | | | | 385/114 |
| 2018/0348464 A1 | 12/2018 | Sato et al. | | |
| 2020/0026015 A1* | 1/2020 | Wells | ..................... | G02B 6/443 |
| 2020/0233165 A1 | 7/2020 | Lang et al. | | |
| 2021/0003796 A1* | 1/2021 | Bringuier | .............. | B29C 48/154 |
| 2022/0113486 A1 | 4/2022 | Marvin et al. | | |

OTHER PUBLICATIONS

Yasutomi, Tetsuya et al., "Development of 6912F Ultra-high Density Optical Cable with 200μm fiber Rollable Ribbon," Proc. International Cable-Connectivity Symposium, P-27, Providence, USA. 2018, 4 pages.

European Extended European Search Report, EP Application No. 23184596.7, date Nov. 27, 2023, 10 pages.

Katsuyama, Yutaka et al., "Transmission loss of coated single-mode fiber at low temperatures", Applied Optics, vol. 19, No. 24, Dec. 15, 1980, 6 pages.

Yabuta, Tetsuro et al., "Excess loss of single-mode jacketed optical fiber at low temperature", Applied Optics, vol. 22, No. 15, Aug. 1, 1983, 7 pages.

Anderson, Clint et al., "Next Generation 6912f Flexible Ribbon Cables with Reduced Diameter," Proceedings: IWCS Oct. 2021, 6 pages.

European Communication pursuant to Article 94(3) EPC, EP Application No. 23184596.7, date Mar. 14, 2025, 8 pages.

* cited by examiner

HIGH FIBER DENSITY CABLE WITH FLEXIBLE OPTICAL FIBER RIBBONS

TECHNICAL FIELD

The present invention relates generally to optical cables, and, in particular embodiments, to high fiber density optical cables with flexible optical fiber ribbons.

BACKGROUND

Optical fibers are very small diameter glass strands capable of transmitting an optical signal over great distances, at very high speeds, and with relatively low signal loss relative to standard copper wire networks. Optical cables are therefore widely used in long distance communication and have replaced other technologies such as satellite communication, standard wire communication etc. Besides long distance communication, optical fibers are also used in many applications such as medicine, aviation, computer data servers, etc.

There is a growing need in many applications for optical cables that are able to transfer high data rates while taking minimum space. Such need can arise, for example, in data servers where space for the optical fiber is a critical limiting factor. In particular, data servers are processing increasingly higher amounts of data that require increased connectivity to the data servers. However, the maximum size of the optical cable is limited by the size of the ducts through which the cables have to be passed through. Squeezing the conventional optical cables through the ducts is not a viable option. This is because while conventional optical fibers can transmit more data than copper wires, they are also more prone to damage during installation. The performance of optical fibers within the cables is very sensitive to bending, buckling, or compressive stresses. Excessive compressive stress during manufacture, cable installation, or service can adversely affect the mechanical and optical performance of conventional optical fibers.

Alternately, changing the size of the ducts can be prohibitively expensive especially in already existing installations.

SUMMARY

In accordance with an embodiment of the present invention, an optical cable includes a first type of ribbon bundles, a second type of ribbon bundles, a third type of ribbon bundles, a plurality of strength rods, and an outer jacket. The first type of ribbon bundles includes a first flexible ribbon. The first flexible ribbon includes a first plurality of optical fibers disposed within a first ribbon bundle jacket. The first type of ribbon bundles is arranged in an interlocking pattern in a central region of the optical cable. The second type of ribbon bundles includes a second flexible ribbon. The second flexible ribbon includes a second plurality of optical fibers disposed within a second ribbon bundle jacket. The third type of ribbon bundles includes a third flexible ribbon. The third flexible ribbon includes a third plurality of optical fibers disposed within a third ribbon bundle jacket. The second type of ribbon bundles and the third type of ribbon bundles are disposed around the first type of ribbon bundles in a peripheral region of the optical cable. The outer jacket is disposed around the second and the third type of ribbon bundles, the plurality of strength rods being at least partially embedded in the outer jacket, where the cumulative cross-sectional area of all of the strength rods in the cable divided by the cumulative cross-sectional area of all glass parts of the optical fibers in the cable is a first value less than 0.22, and where, at a temperature between −40° C. and 0° C. and at a wavelength of 1550 nm, the attenuation increase of the optical fibers in the cable relative to 25° C. is below 0.15 dB/km. In accordance with an embodiment of the present invention, a high fiber density optical cable includes a cable core. The high density optical cable includes more than 1700 optical fibers, where the fibers are arranged in flexible ribbons in a non-planar configuration. Each flexible ribbon comprises 12 or more optical fibers that are intermittently bonded to neighboring fibers, where the flexible ribbons are grouped in 5 or more ribbon bundles. Each ribbon bundle includes a soft deformable bundle jacket completely surrounding the flexible ribbon bundle, where the cable core has a fiber density of 10 optical fibers/mm$^2$ or more. An outer jacket surrounds the cable core, where the outer jacket material at least partially embeds at least two strength rods, and surrounds the cable core, where the cumulative cross-sectional area of all of the at least two strength rods in the cable divided by the cumulative cross-sectional area of all glass parts of the optical fibers in the cable is a first value less than 0.22, and where at a temperature between −40° C. and 0° C. and at a wavelength of 1550 nm, the attenuation increase of the optical fibers in the cable relative to 25° C. is below 0.15 dB/km.

In accordance with an embodiment of the present invention, a method of forming an optical cable includes stranding a first type of ribbon bundles, a second type of ribbon bundles, and a third type of ribbon bundles in a strander, the first type of ribbon bundles comprising a first flexible ribbon comprising a first plurality of optical fibers disposed within a first ribbon bundle jacket; the second type of ribbon bundles comprising a second flexible ribbon comprising a second plurality of optical fibers disposed within a second ribbon bundle jacket; the third type of ribbon bundles comprising a third flexible ribbon comprising a third plurality of optical fibers disposed within a third ribbon bundle jacket, each of the first, the second, and the third ribbon bundle jacket comprising a soft deformable material. The method further includes extruding an outer jacket around the second and the third type of ribbon bundles, the extruding arranging the first type of ribbon bundles in an interlocking pattern in a central region of the optical cable and the second type of ribbon bundles and the third type of ribbon bundles around the first type of ribbon bundles in a peripheral region of the optical cable.

BRIEF DESCRIPTION OF THE DRAWINGS

For a more complete understanding of the present invention, and the advantages thereof, reference is now made to the following descriptions taken in conjunction with the accompanying drawings, in which:

FIG. 2A-2G illustrates an optical cable in accordance with an embodiment of the present invention, wherein FIG. 2A illustrates a cross-sectional view of the optical cable, wherein FIG. 2B illustrates a projection view of an array of optical fibers, wherein FIG. 2C illustrates a corresponding cross-sectional area of the array of optical fibers illustrated in FIG. 2B, wherein FIG. 2D illustrates a projection view of a flexible ribbon formed using the array of optical fibers, wherein FIG. 2E illustrates a flexible ribbon formed using the array of optical fibers, wherein FIG. 2F illustrates a deformable ribbon bundle formed using a plurality of flexible ribbons, and wherein FIG. 2G illustrates a projection view of the optical cable;

FIGS. 3A-3D illustrate alternative designs for the optical cable in accordance with various embodiments of the invention, wherein FIG. 3A illustrates a cross-sectional view of the optical cable, wherein FIG. 3B illustrates a corresponding projection view of FIG. 3A, and wherein FIGS. 3C-3D illustrate a cross-sectional view of the optical cable with alternative designs;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely design of optical cables having a high density of optical fibers per unit cross-sectional area.

Figure 1:
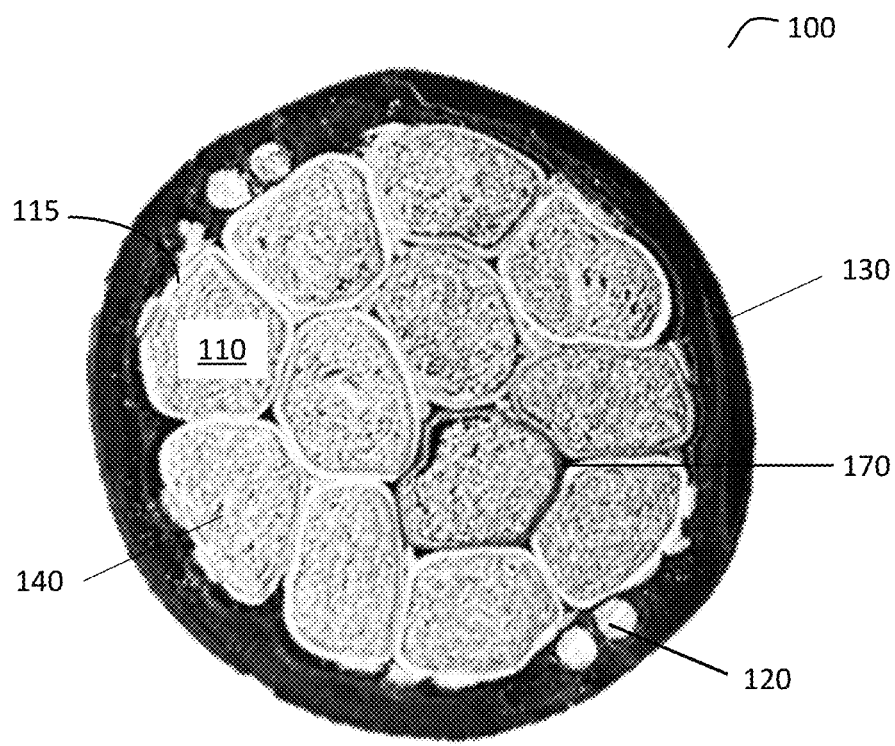
FIG. 1 illustrates an optical cable in accordance with an embodiment of the present invention.

FIG. 1 illustrates an optical cable in accordance with an embodiment of the present invention.

Referring to FIG. 1, in one or more embodiments, the optical cable 100 comprises a plurality of deformable ribbon bundles 110 (also known as buffer tubes) formed within an outer jacket 130. Although twelve deformable ribbon bundles are shown in FIG. 1, this number is not necessarily indicative of the total number of ribbon bundles 110 that will be included. FIG. 1 (as well as other figures in this application) is not necessarily indicative of the shape of the plurality of deformable ribbon bundles 110. In particular, although for practical reasons many of these have been illustrated as circular and polygonal objects, the plurality of deformable ribbon bundles 110 are non-circular or shaped irregularly due to deformation. For example, as illustrated in FIG. 1, one of the plurality of deformable ribbon bundles 110 has a first dimension along a radial direction of the optical cable and a second dimension along a direction perpendicular to this radial direction. Unlike conventional ribbon bundles, where the first dimension would be equal to the second dimension, the second dimension is different (e.g., smaller or larger) than the first dimension. In particular, depending on where the dimension of the deformable ribbon bundles 110 is measured, a different dimension may be observed unlike a conventional ribbon bundle that is circular. In other words, in the cross-sectional view illustrated in FIG. 1, the deformable ribbon bundles 110 have been deformed such that it has a non-circular cross-section.

In one or more embodiments, the deformable ribbon bundles 110 comprise a plurality of flexible ribbons 140 and a ribbon bundle jacket 115 enclosing the flexible ribbons 140. The flexible ribbons 140 run length-wise down the ribbon bundle 110. In one embodiment, the deformable ribbon bundle 110 may comprise a single flexible ribbon. In other embodiments, the deformable ribbon bundle 110 may comprise a plurality of flexible ribbons.

In one or more embodiments, the ribbon bundle jackets 115 comprise a soft deformable material with a thin wall structure and a low modulus that allows for preferential deformation with the stranded core. The soft deformable material may have an elastic modulus or Young's modulus (according ASTM D882-12) of less than 5000 psi, with a preferred range from 1000 psi to 4000 psi. The tube deformation allows for efficient space utilization to achieve a large diameter reduction of the optical cable. For example, the ribbon bundle jacket 115 may comprise a thermoplastic flexible material such as acrylic or polymethyl methacrylate (PMMA), polycarbonate (PC), polyethylene (PE), polypropylene (PP), polyethylene terephthalate (PETE or PET), polyvinyl chloride (PVC), or acrylonitrile-butadiene-styrene (ABS). The inventors have identified that the elastic modulus and wall thickness are two important properties for the ribbon bundle jacket 115, as provided herein. The wall thickness of the ribbon bundle jacket 115 is maintained to enable the flexibility of the plurality flexible ribbons 140 within the deformable ribbon bundle 110. In one or more embodiments, the deformable ribbon bundle 110 may have a diameter between 1 mm and 8 mm, 7-8 mm in one embodiment. In one or more embodiments, the ribbon bundle jacket 115 may have a wall thickness between 0.05 mm and 0.3 mm, e.g., 0.2 mm in one embodiment. The plurality of flexible ribbons 140 run lengthwise along the deformable ribbon bundle 110. The deformable ribbon bundles 110 may also comprise a ripcord to provide access to the plurality of flexible ribbons 140 within the deformable ribbon bundle 110. For example, the ripcord pull force may range from 4-7 N to access the fibers within the deformable ribbon bundle. In other words, pulling the ripcord with a force of about 4-7 N will cause the ripcord to tear and open the ribbon bundle jacket 115, providing access to the flexible ribbons. The deformable ribbon bundle may further comprise water swellable yarn and water swellable tape to prevent water ingress. The water swellable yarn and water swellable tape may be wrapped around the plurality of flexible ribbons 140 followed by the ribbon bundle jacket 115.

While the flexible ribbons may simply be bundled, the addition of the ribbon bundle jacket 115 with a soft deformable material has many advantages. Specifically, the flexible ribbons can be compressed tighter without getting glued together. In addition, the ribbon bundle jacket 115 better protects the fibers within the ribbon bundle jacket 115 during termination/installation and tube routing process within splice trays as well as during later enclosure access.

In one or more embodiments, the deformable ribbon bundles 110 are arranged in an interlocking pattern. The tubes are compressed to remove most of the void space in the core of the cable so as to be essentially interlocked (described as interlocking pattern in this application). For example, as shown in FIG. 1, the plurality of deformable ribbon bundles 11o in the central region physically contact two other deformable ribbon bundles 110 in the central region and a plurality of deformable ribbon bundles 110 in the peripheral region. The plurality of deformable ribbon bundles 110 in the peripheral region physically contact adjacent deformable ribbon bundles 110 and the outer jacket 130. In an embodiment, each of the deformable ribbon bundles 110 in the central region physically contact all other deformable ribbon bundles 110 in the central region.

Adjacent ribbon bundles of the plurality of deformable ribbon bundles 110 physically contact with each other along a larger surface area. As a consequence, the amount of voids or interstices 170 within the optical cable is significantly reduced with the interlocking pattern. In the illustration of FIG. 1, the amount of voids or interstices 170 relative to the total cross-sectional area is very small since the plurality of deformable ribbon bundles 110 have adapted to the shape of the optical cable. In an example embodiment, the amount of voids or interstices 170 within the optical cable is less than or equal to 15 mm$^2$ for a cable having a cross sectional area of approximately 650 mm$^2$ to 850 mm$^2$.

As discussed above, deformable ribbon bundles 110 contain a plurality of flexible ribbons 140. The plurality of flexible ribbons 140 comprise a plurality of optical fibers arranged parallel to each other and intermittently connected at bond regions. For example, the deformable ribbon bundle 110 may comprise twenty-four flexible ribbons with twenty-four optical fibers in each flexible ribbon 140. In this example, the deformable ribbon bundle 110 includes 576 optical fibers with a bundle density (expressed as number of optical fibers per cross sectional area of a deformable ribbon bundle) greater than or equal to 11.0 fibers/mm$^2$. In one or more embodiments, the optical cable 100 may comprise more than 6000 optical fibers with a cable fiber density (expressed as number of optical fibers per cross sectional area of the cable) greater than or equal to 8.0 fibers/mm$^2$. In another embodiment, the optical cable 100 may comprise more than 3000 fibers with a cable fiber density greater than or equal to 7.0 fibers/mm$^2$. In another embodiment, the optical cable 100 may comprise more than 1700 fibers with a cable density greater than or equal to 6.1 fibers/mm$^2$. Such packing density is not achievable with conventional cables due to space required by interstices and voids as well as strength members needed to achieve the required mechanical properties.

In a conventional design, the flexible ribbons are packaged into buffer tubes. The flexible ribbons are then buffered within a polymeric buffer tube that further comprises water swellable tape and/or water swellable yarns. The buffer tubes are stranded around a central rigid strength member. The stranded core is then jacketed with an outer jacket with a thickness to meet industry requirements. The inventors of this application identified that although the stranded components are rigid for protection, the buffer tubes are unable to deform thus underutilizing space within the cable.

On the other hand, if individual fibers were directly placed within the optical cable without the use of ribbon bundles, they would have a higher packing density. However, such a design would make it much more difficult to identify the fibers individually when the total number of fibers within each cable is large, e.g., in the hundreds or thousands. Further extruding a jacket around such large number of individual fibers does not seem feasible without damaging some of the fibers.

Therefore, there is a need for a fiber optic cable that provides high packing density of optical fibers while maintaining sufficient structural, thermal, and optical properties. For example, while packing more number of optical fibers, the optical cable also has to have adequate tensile strength, resistance to crushing, resistance to buckling, resistance to thermal contraction while maintaining optical connection.

Embodiments of the present invention avoid the above issues by providing deformable ribbon bundles without a central rigid strength member which allows the ribbon bundles to be compressed or squeezed together in a tighter configuration. Embodiments of the present invention achieve this by a combination of using flexible ribbons and designing the ribbon bundle jacket to be deformable. As the interstices between adjacent ribbon bundles are filled by the deformable ribbon bundles, more optical fibers are packed within the same dimension cable than possible in a conventional optical cable. The absence of the central rigid strength members results in a large savings in cross-sectional area. The inventors of this application have identified that carefully placing smaller strength members in the outer jacket of the cable along with tightly packed ribbon bundles can achieve mechanical strength characteristics comparable to conventional designs with central rigid strength members.

In practice, adjacent deformable ribbon bundles 110 may adapt differently based on the local stress induced by the outer jacket 130 as well as other factors such as the materials being used and the stranding process. However, in various embodiments, the plurality of deformable ribbon bundles 110 has undergone deformation during the formation of the optical cable.

As illustrated in FIG. 1, the plurality of deformable ribbon bundles 110 are deformed to a non-circular shape that fits within the outer jacket 130. The outer jacket 130 may comprise of medium-density polyethylene (MDPE) or high-density polyethylene (HDPE) to provide robustness together with peripheral strength members 120. The outer jacket 130 may have a jacket thickness of approximately 2 mm to 2.5 mm. The outer jacket 130 may include a number of layers such as an outer cover, a water blocking layer, and an optional outer strength member. The outer jacket 130 may comprise polyurethane, polyethylene, nylon, or other suitable material. In one embodiment, the outer jacket 130 includes medium-density polyethylene (MDPE), with a nominal jacket thickness of approximately 2 mm, so as to comply with the standards for fiber optic cables such as Telcordia GR-20, ICEA-640. Flame-retardant additives may also be included into the outer jacket 130. The water blocking layer in the outer jacket 130 may include water blocking threads, water blocking tapes, or other super absorbent powder type materials.

Compared to a prior art cable that includes a rigid strength member in the central region, the cable in embodiments discussed in this application includes smaller radial strength members. Cables with radial strength members have a preferential bending axis which can make cable routing more difficult. Although a single rigid strength member placed in the central region eliminates the axial bending preference, the cable in embodiments discussed in this application contain strength members along roughly diametrically opposite locations so as to enable bending in other directions.

In one or more embodiment, the outer jacket 130 comprises a plurality of peripheral strength members 120, where each of the plurality of peripheral strength members 120 may be a strength rod. Although four peripheral strength members 120 are shown in FIG. 1, this number is not necessarily indicative of the total number of peripheral strength members 120 that will be included. In one or more embodiments, one peripheral strength member 120 is disposed opposite to another peripheral strength members 120. In another embodiment, two peripheral strength members 120 are disposed opposite to two other peripheral strength members 120. The plurality of peripheral strength members 120 may physically contact adjacent peripheral strength members 120. In one or more embodiments, the diameter of the peripheral strength member 120 range from 1 mm to 3 mm, for example, 1.6 mm to 2.2 mm in one embodiment. The outer jacket 130 may fully or partially encapsulate the peripheral strength members 120. When the outer jacket 130 partially encapsulates the peripheral strength members 120, a portion of the peripheral strength members 120 may physically contact an adjacent ribbon bundle within the cable. The strength member-to-glass area ratio of the cross-sectional area of the peripheral strength members 120 and the cumulative area of all of the glass part of the optical fibers 160 in the optical cable 100 may be less than 0.22, e.g., between 0.05 and 0.22. In other words, the cumulative cross-sectional area of all of the strength members in the cable divided by the cumulative cross-sectional area of all of the glass part of the optical fibers in the cable is less than 0.22. The cumulative cross-sectional area of all of the strength members is a summation of the cross-sectional area of all individual strength members. Similarly, the cumulative cross-sectional area of all of the glass part of the optical fibers is a summation of the cumulative cross-sectional area of glass area of all individual optical fibers. The glass part of the optical fibers 160 therefore does not include the various coatings. Simultaneously, along with having the strength member-to-glass area ratio less than 0.22, at a temperature between −40° C. and 0° C. and at a wavelength of 1550 nm, the attenuation increase of the optical fibers in the cable relative to 25° C. is below 0.15 dB/km. In further embodiments, simultaneously along with having the strength member-to-glass area ratio less than 0.22, through the entire range of temperatures between −40° C. and 0° C. and at a wavelength of 1550 nm, the average attenuation increase of the optical fibers in the cable relative to 25° C. is below 0.15 dB/km, where the average attenuation increase is the attenuation increase averaged over the temperature range −40° C. to 0° C. As will be clear from the descriptions below, conventional designs cannot simultaneously achieve both a low attenuation increase and low strength member-to-glass area ratio.

In addition, in various embodiments, the ratio between the cumulative cross sectional area of the strength members 120 in the outer jacket and the cumulative cross sectional area of the polymer like material in the cable (including the outer jacket, jacket of the ribbon bundles, and coatings around the optical fibers) ranges from 0.01 to 0.025. In an embodiment, the cumulative cross sectional area of the strength members 120 in the outer jacket divided by the cumulative cross sectional area of the polymer like material in the cable (including the outer jacket, jacket of the ribbon bundles, and coatings around the optical fibers) is less than 0.025.

The peripheral strength member 120 provides mechanical integrity of the cable when experiencing heavy longitudinal and/or bending strains and stresses. In one or more embodiments, the cable stiffness as described in more detail below may be greater than or equal to 60 N/cm. For example, during installation, the cables may be subjected to significant strain. The peripheral strength member 120 is a rigid material and is the primary anti-buckling element in the cable. The peripheral strength member 120 resists cable contraction at low temperatures and prevents optical fiber buckling, which would otherwise occur due to coefficient of expansion differential between optical fibers and other plastic cable components. The peripheral strength member 120 prevents the cable from being compressed and provides a primary clamping point for hardware used to connect the cable to splice and routing enclosures.

The peripheral strength member 120 may be a strength rod and made of metallic elements, glass reinforced composite rods such as glass reinforced plastic rods, aramid reinforced composite rods, or composite rods made of some other high modulus, low coefficient of expansion material such as carbon fiber (carbon fiber reinforced composite rods).

Embodiments of the present disclosure provide a diameter reduction greater than 20% from other commercially available designs. For example, a conventional optical cable may comprise an 11.5 mm central strength member with twenty-four ribbon bundles in which each ribbon bundle contains 288 optical fibers. Such a conventional optical cable would have a diameter of 38 mm with 6912 optical fibers. Compared to the convention optical cable design, for example, the optical cable 100 of FIG. 1 may have a diameter D of 31 mm. In one or more embodiments, the outside diameter D of the optical cable 100 may range from 29 mm to 32 mm. The optical cable 100 contains twelve deformable ribbon bundles 110 in which each deformable ribbon bundle 110 contains twenty-four fiber ribbons with twenty-four optical fibers or 576 optical fibers with a total of 6912 optical fibers. By reducing the diameter of the optical cable, it is possible to increase the length per reel while utilizing standard shipping and installation equipment. For example, advantageously, the capable length per reel may increase from 10,000 ft to more than 15,000 ft while utilizing standard shipping and installation equipment. In addition, the ribbon bundle may handle a 60 mm bend radius to adequately route into a splice tray.

Several tests were performed to determine the viability of applicant's embodiments. Cable stiffness test and cable core pullout test were conducted on a 31 mm 6912 fiber cable. The 6912 fiber cable includes 6912 optical fibers and has the design described below with respect to FIGS. 1-2G.

In the cable stiffness test, a 350 mm sample was used. The cable stiffness test was set up as specified in IEC 60794-1-21 (Ed. 1 2015-03) (method E17A). The 350 mm sample was positioned on a support with a span of 300 mm. Compression was applied to the cable at a rate of 30 mm/min. The cable was displaced a distance of 30 mm. The cable stiffness measured at the displacement between 5 and 20 mm was above 60N/cm.

The cable core pullout test was performed to quantitatively measure the pressure inside the jacketed cable. In the cable core pullout test, a 12 inch (300 mm) sample was used. The sample was cut back by 4 inches (10 cm) and all components except a single inner tube were removed. The single inner tube was pulled at a rate of 2.0 mm/min. The maximum force measured by the core pullout test was less than or equal to 7.5 lbs (33.4 N) force.

Thus, unexpectedly, inventors of this application were able to achieve excellent performance from the cable despite the absence of the central strength members. Although, a high fiber packing density is a long felt need for the cable industry, there were no commercially available cables with the high packing densities achieved by inventors unlike the embodiments described in this application that also met the mechanical and optical requirements. Specifically, the inventors of this application are able to achieve a low strength member-to-glass area ratio without compromising optical characteristics of the cable. For example, cables without strength members may suffer from severe attenuation, i.e., optical losses, especially at lower temperatures due to shrinkage and bending, or caused by installation and handling of the cable. In various embodiments, the minimalistic strength members located in the periphery of the cable provide the mechanical properties to mitigate such optical losses at low temperatures. On the other hand, by not having central strength members along with deformable ribbon bundles, a significantly higher number of optical fibers can be packed within a same cross-sectional area of the optical cable so as to increase the number of optical fibers within a given cross-sectional area of the cable.

Figure 2A:
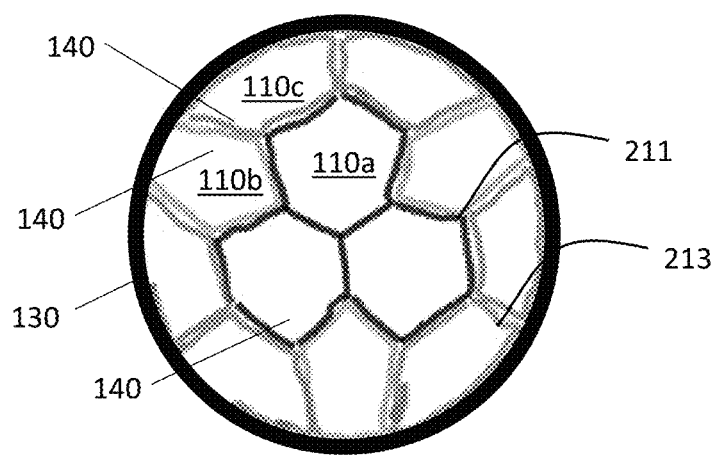
Figure 2B:
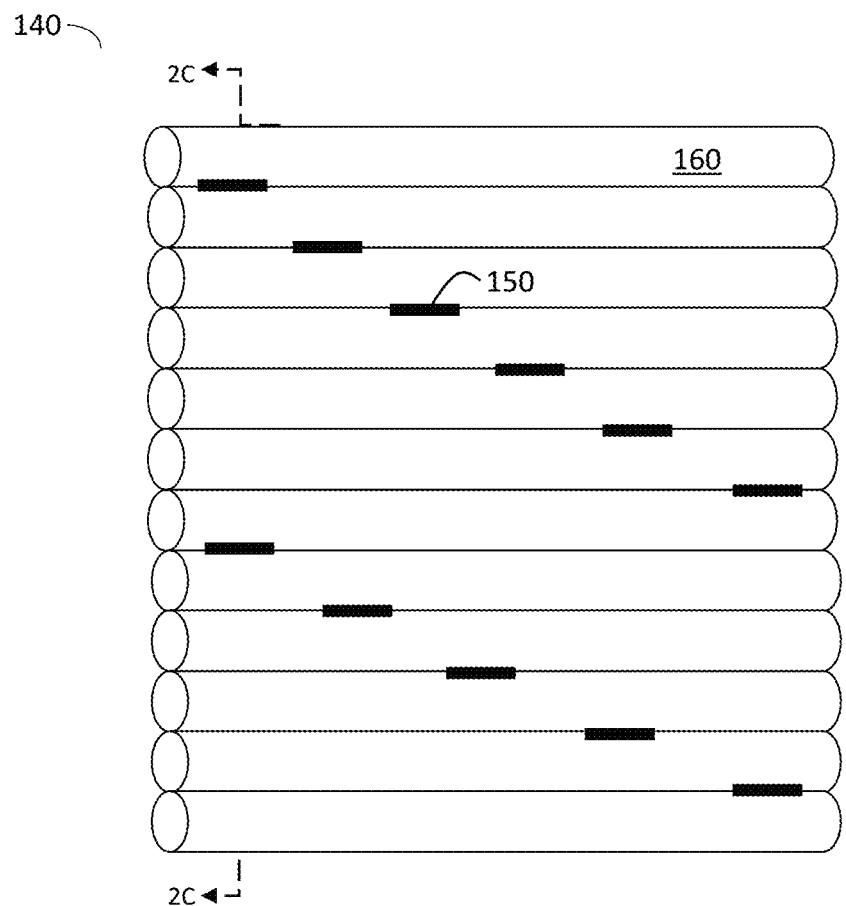
Figure 2C:
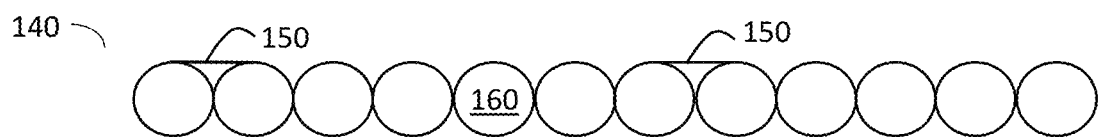
Figure 2D:
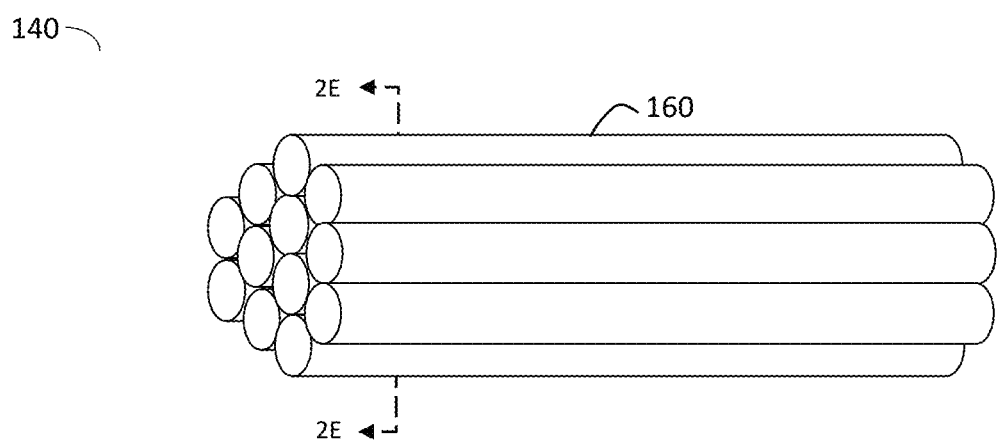
Figure 2E:
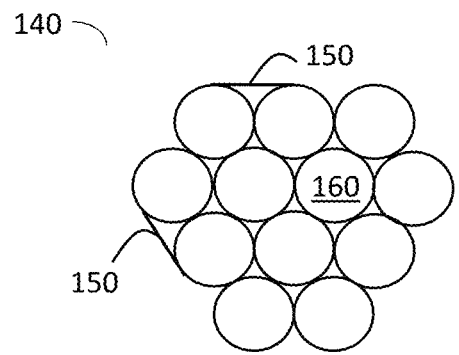
Figure 2F:
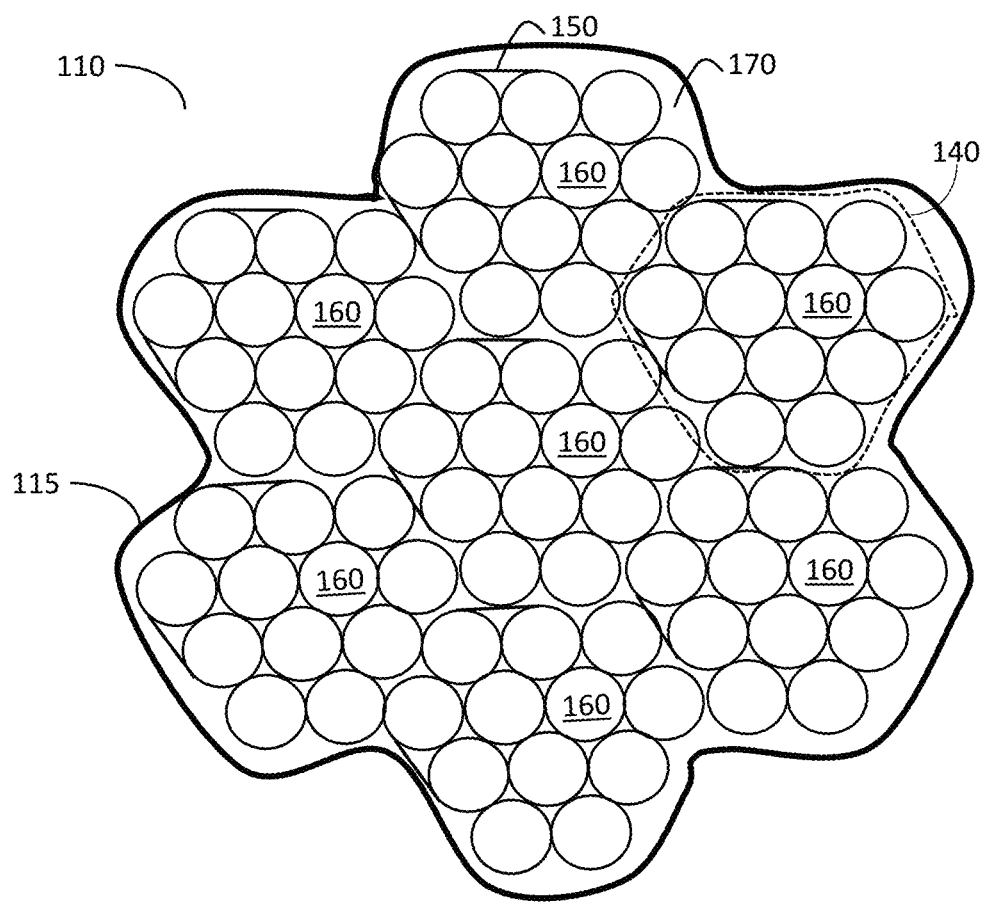
Figure 2G:
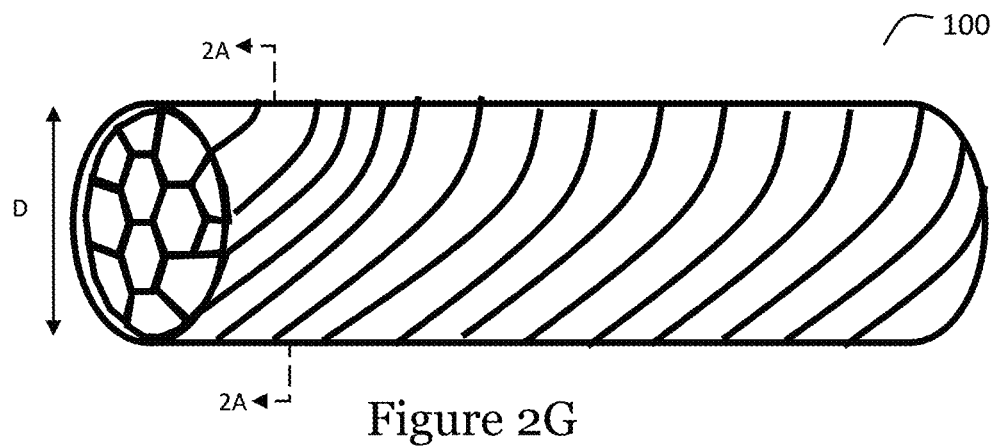

FIG. 2A-2G illustrates an optical cable in accordance with an embodiment of the present invention, wherein FIG. 2A illustrates a cross-sectional view of the optical cable, wherein FIG. 2B illustrates a projection view of an array of optical fibers, wherein FIG. 2C illustrates a corresponding cross-sectional area of the array of optical fibers illustrated in FIG. 2B, wherein FIG. 2D illustrates a projection view of a flexible ribbon formed using the array of optical fibers, wherein FIG. 2E illustrates a corresponding cross-section area of the flexible ribbon formed using the array of optical fibers illustrated in FIG. 2D, wherein FIG. 2F illustrates a deformable ribbon bundle formed using a plurality of flexible ribbons, and wherein FIG. 2G illustrates a projection view of the cable core of the optical cable illustrated in FIG. 2A.

Referring to FIG. 2A, in one or more embodiments, the optical cable comprises a plurality of deformable ribbon bundles 110 that are formed within an outer jacket 130. The plurality of deformable ribbon bundles 110a 110b and 110c includes the features of the deformable ribbon bundles 110 as described in FIG. 1. A first type of deformable ribbon bundles 110a are arranged in an interlocking pattern in a central region of the optical cable to form a central core 211. The first type of deformable ribbon bundles 110a comprise a plurality of flexible ribbons 140. A second type of deformable ribbon bundle 110b are arranged between the first type of deformable ribbon bundles 110a and the outer jacket 130. The second type of deformable ribbon bundles 110b comprise a plurality of flexible ribbons 140. A third type of deformable ribbon bundle 110c are arranged adjacent to the first type of deformable ribbon bundles 110a and the second type of deformable ribbon bundles 110b. The third type of deformable ribbon bundle 110c comprises a plurality of flexible ribbons 140. The second type of deformable ribbon bundles 110b and third type of deformable ribbon bundles 110c interlock with the first type of deformable ribbon bundles 110a and form an adjacent concentric row 213 surrounding the central core 211.

For example, as illustrated in FIG. 2A, the first type of deformable ribbon bundles 110a may have a substantially hexagonal cross-section. The first type of deformable ribbon bundles 110a may physically contact the first type of deformable ribbon bundles 110a on two sides, the second type of deformable ribbon bundles 110b on two sides, and the third type of deformable ribbon bundles 110c on two sides. The second type of deformable ribbon bundles 110b may have a substantially pentagonal cross-section. The second type of deformable ribbon bundle 110b may physically contact the first type of deformable ribbon bundles 110a on two sides, the third type of deformable ribbon bundles 110c on two sides, and the outer jacket 130 on one side. The third type of deformable ribbon bundles 110c may have a substantially trapezoidal cross-section. The third type of deformable ribbon bundles 110c may physically contact the first type of deformable ribbon bundles on one side, the second type of deformable ribbon bundles 110b on one side, the third type of deformable ribbon bundles 110c on one side, and the outer jacket 130 on one side. In one or more embodiments, each of the first type 110a, second type 110b, and third type of deformable ribbon bundles 110c may comprise a different number of optical fibers 160.

As will described below in greater detail, in the case of plurality of flexible ribbons 140, due to the random distribution of each of the plurality of flexible ribbons 140 in the deformable ribbon bundle 110, a highly compact ribbon bundle structure can be realized. Moreover, due to the aforementioned flexibility of the plurality of flexible ribbons 140, reshaping of the deformable ribbon bundle 110 into non-circular or irregular shapes is possible.

FIGS. 2B-2F illustrate the design of the flexible ribbon and deformable ribbon bundles that enables such an adaptable design in accordance with embodiments of the present invention.

Referring to FIG. 2B, as will further described in the following figures, each ribbon bundle of the plurality of deformable ribbon bundles 110 comprises a plurality of flexible ribbons 140. Each of the plurality of flexible ribbons 140 comprise a plurality of optical fibers 160. FIG. 2B is not indicative of the total number of optical fibers although only twelve fibers are shown.

The plurality of optical fibers 160 are arranged parallel to each other and are intermittently connected at bond regions 150. However, as illustrated in FIGS. 2B-2C, the bond regions 150 are arranged across the flexible ribbon 140 so as to selectively leave a large surface of the flexible ribbon free of the bonding material that forms the bond region 150. Consequently, the plurality of optical fibers 160 maintain a large degree of freedom and can be effectively folded or otherwise randomly positioned in a non-planar configuration when the ribbon is subjected to external stress, for example, as shown in FIGS. 2D-2E.

In various embodiments, the plurality of optical fibers 160 can be folded into a densely packed configuration as shown in FIGS. 2D-2E. In one or more embodiments, the folded optical fibers 160 may have a non-circular or irregular shape.

FIG. 2F illustrates a deformable ribbon bundle 110 comprising a plurality of flexible ribbons 140 that has been deformed during the formation of the optical cable in accordance with an embodiment of the present invention.

The flexible ribbons 140 are enclosed by a ribbon bundle jacket 115. In one or more embodiments, the ribbon bundle jacket 115 comprises a thermoplastic flexible material such as acrylic or polymethyl methacrylate (PMMA). In other embodiments, the ribbon bundle jacket 115 comprises polycarbonate (PC), polyethylene (PE), polypropylene (PP), polyethylene terephthalate (PETE or PET), polyvinyl chloride (PVC), or acrylonitrile-butadiene-styrene (ABS).

In addition, the flexible ribbons 140 may be dispersed within a gel that allows the flexible ribbons 140 to move around relative to each other. Further, the thickness of the ribbon bundle jacket 115 is maintained to enable the flexibility of the ribbons. The lower thickness of the deformable ribbon bundle jackets 115 ensures deformation of the ribbon bundles when subjected to stress. In particular, the thickness of the ribbon bundle jacket 115 relative to the diameter of the deformable ribbon bundle 110 is maintained within a range of 0.005 to 0.04. A typical deformable ribbon bundle prior to deformation has a diameter between 5 mm to 10 mm, for example, 7.6 mm.

During the formation of the optical cable, the ribbon bundle may be subjected to compressive stress. Ribbon bundles may show increased deformation under an equivalent stress due to the temperature dependent modulus reduction during jacketing. As a consequence, the flexible ribbons 140 within the deformable ribbon bundle 110 may rearrange the shape/configuration to compensate or minimize this compressive stress.

As described above, in various embodiments, the optical cables include deformable ribbon bundles 110. However, some of the deformation of the deformable ribbon bundles 110 is caused by a rearrangement of the flexible ribbons within the optical cable and as such does not result in twisting or bending of the optical fibers. Therefore, embodiments of the present invention achieve improved packing density without compromising on mechanical or optical characteristics of the optical cable.

In conventional designs, flat optical fiber ribbons are arranged into a rectangular stack that is twisted together to maintain its rectangular shape and to average any compressive or tensile stress on the optical fiber ribbon stack across the different optical fibers down the length of the cable. However, in the various embodiments described in the present application, it is not necessary to twist the ribbons within each deformable ribbon bundle 110 because there is no need to maintain the shape if the ribbons are randomly distributed in the tube.

The foldable flexible ribbons 140 are run lengthwise along each deformable ribbon bundle 110, and each flexible ribbon 140 is allowed to take a random configuration. Subsequent twisting, if any, of the plurality of deformable ribbon bundles 110 while forming the cable is sufficient to average strain across the optical fibers and meet mechanical and optical standards for the fiber optic cable.

Although, in FIG. 2F, only seven flexible ribbons 140 are shown to be within the plurality of ribbon bundles, in various embodiments, the plurality of deformable ribbon bundles 110 may include a much larger or even a smaller number of flexible ribbons 140. For example, in one embodiment the plurality of deformable ribbon bundles 110 may comprise six, twelve or twenty four flexible ribbons 140. In addition, each of the flexible ribbons 140 may include any suitable number of optical fibers 160. The optical fibers 160 may have a diameter in the range of 150 μm to 250 μm in various embodiments, such as 180 μm or 200 μm. For example, each of the flexible ribbons 140 may include twenty-four optical fibers in one illustration. Therefore, as an example, each of the plurality of deformable ribbon bundles 110 includes 144, 288 or 576 optical fibers.

Using embodiments of the present invention, the optical cable may have a core fiber density (expressed as number of fibers per cross section circumscribed by the inner diameter of the cable jacket) of 10.0 fibers per square millimeter (fibers/mm$^2$) or greater. In one or more embodiments, the cable fiber density of the optical cable (expressed as number of optical fibers per cross sectional area of the cable) may be between 6.0 fibers/mm$^2$ to 9.5 fibers/mm$^2$, and in one example, between 8.5 fibers/mm$^2$ to 9.5 fibers/mm$^2$.

FIG. 2G illustrates a projection view of one embodiment of an optical cable core.

Referring to FIG. 2G, in one or more embodiments, the optical cable core comprises a plurality of deformable ribbon bundles 110 that are formed within an outer jacket 130. A first type of deformable ribbon bundles 110a arranged in an interlocking pattern in a central region of the optical cable. A second type of deformable ribbon bundle 110b arranged between the first type of deformable ribbon bundles 110a and the outer jacket 130. A third type of deformable ribbon bundle 110c arranged adjacent to the first type of deformable ribbon bundles 110a and the second type of deformable ribbon bundles 110b. The first type of deformable ribbon bundles 110a, second type of deformable ribbon bundles 110b and third type of deformable ribbon bundle 110c are simultaneously twisted in the same direction to form a helical strand. By twisting the deformable ribbon bundles 110 in the same direction, the helical strand reduces the size of the voids compared to a conventional cable that includes layers of ribbon bundles with each layer twisting in an alternating direction.

For example, as illustrated in FIG. 2G, the first type of deformable ribbon bundles 110a may have a substantially hexagonal cross-section. The first type of deformable ribbon bundles 110a may physically contact the first type of deformable ribbon bundles 110a on two sides, the second type of deformable ribbon bundles 110b on two sides, and the third type of deformable ribbon bundles 110c on two sides. The second type of deformable ribbon bundles 110b may have a substantially pentagonal cross-section. The second type of deformable ribbon bundle 110b may physically contact the first type of deformable ribbon bundles 110a on two sides, the third type of deformable ribbon bundles 110c on two sides, and the outer jacket 130 on one side. The third type of deformable ribbon bundles 110c may have a substantially trapezoidal cross-section. The third type of deformable ribbon bundles 110c may physically contact the first type of deformable ribbon bundles on one side, the second type of deformable ribbon bundles 110b on one side, the third type of deformable ribbon bundles 110c on one side, and the outer jacket 130 on one side.

Figure 3A:
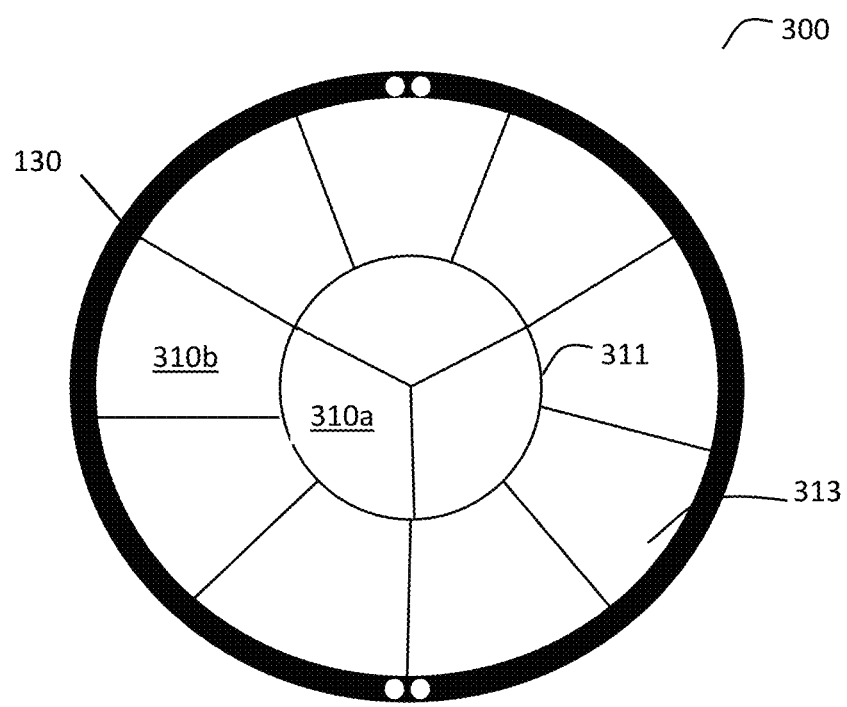
Figure 3B:
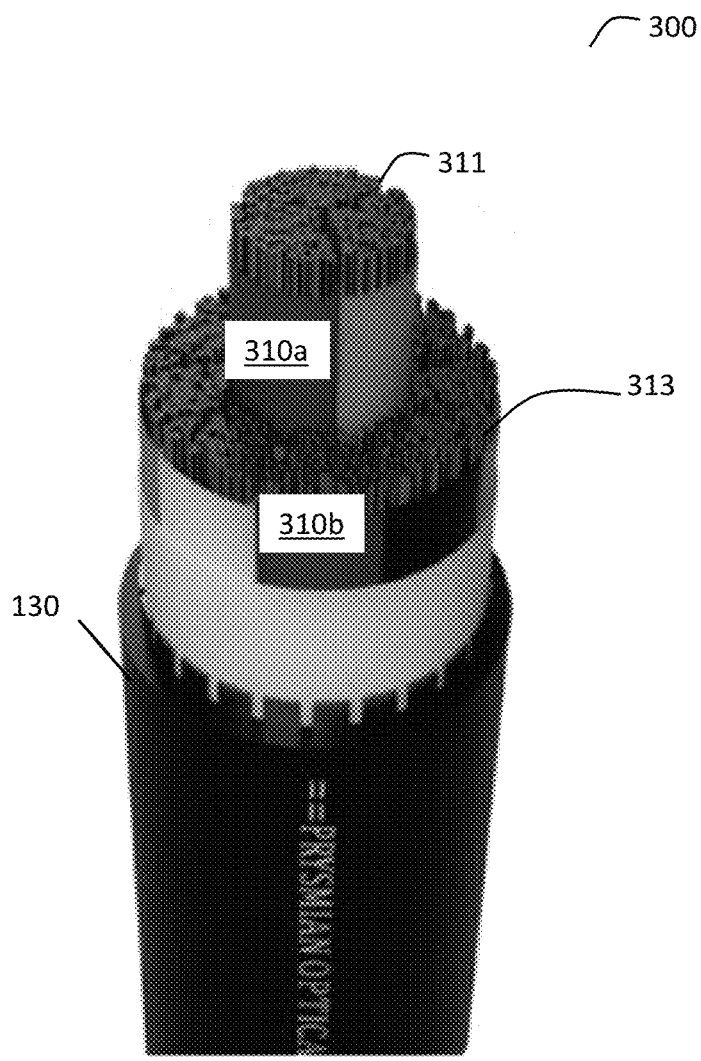
Figure 3C:
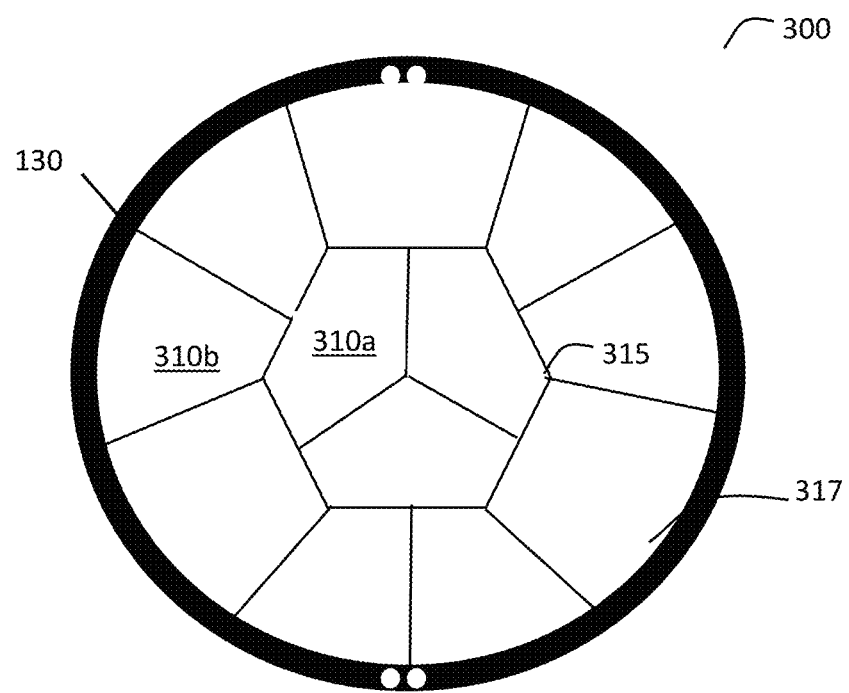
Figure 3D:
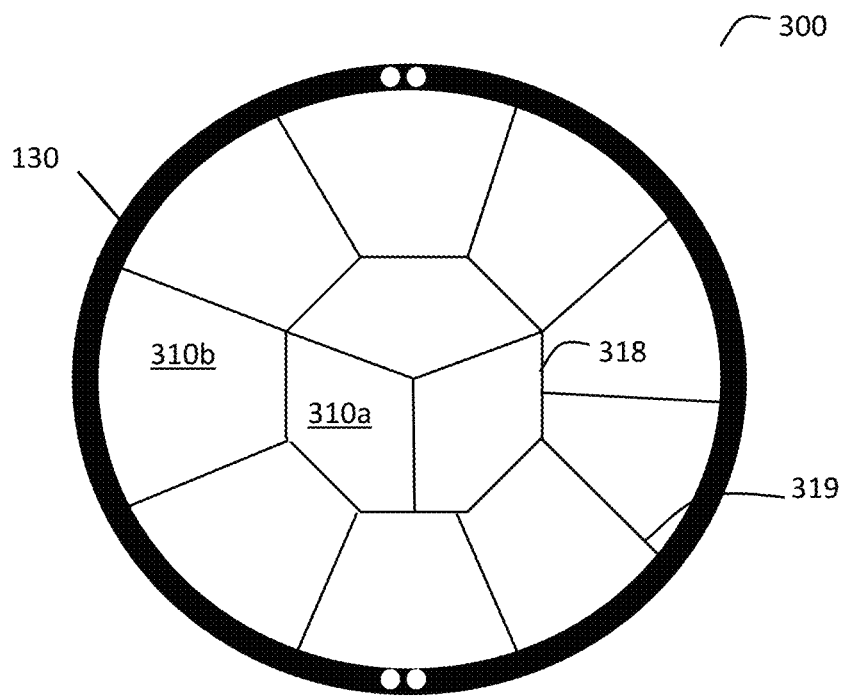

FIGS. 3A-3D illustrate alternative designs for the optical cable in accordance with various embodiments of the invention, wherein FIG. 3A illustrates a cross-sectional view of the optical cable, wherein FIG. 3B illustrates a corresponding projection view of FIG. 3A, and wherein FIGS. 3C-3D illustrate a cross-sectional view of the optical cable with alternative designs. FIGS. 3A-3D illustrate design arrangements with alternative cross-sectional shapes of the interlocked deformable ribbon bundles in the central core of the optical cable. The final cross-sectional shape of the core interlocked deformable ribbon bundles may be made different to fit a certain type of configuration and are not representative of the final shape.

Referring to FIGS. 3A-3D, in one or more embodiments, the optical cable comprises a central core of deformable ribbon bundles 310a and an adjacent concentric row of deformable ribbon bundles 310 that are formed within an outer jacket 130. The deformable ribbon bundles 310 in FIGS. 3A-3D includes the features of deformable ribbon bundles 110 as described in FIGS. 1-2F. The central core of the optical cable comprise a first plurality of deformable ribbon bundles 310a and the adjacent concentric row comprise a second plurality of deformable ribbon bundles 310b. The central core may be formed in various shapes and sizes. Although three deformable ribbon bundles are shown in the central core and nine deformable ribbon bundles shown in the adjacent concentric row in FIGS. 3A-3D, these numbers are not necessarily indicative of the total number of ribbon bundles 310 that will be included in a central core and adjacent concentric row. Each deformable ribbon bundles may include the same or a different number of fibers in the central core and the adjacent concentric row.

For example, FIGS. 3A-3B illustrates a cross-sectional design view of the optical cable 301 with a circular central core 311 and an adjacent concentric row 313 formed by deformable ribbon bundles 310b. The circular central core 311, as shown in FIGS. 3A-3B, comprise three sectors of the deformable ribbon bundles 310a. The adjacent concentric row 313 comprise nine sectors of deformable ribbon bundles 310b. Each of the deformable ribbon bundles 310a in the central core 311 physically contact the other deformable ribbon bundles 310a on two sides and at least three deformable ribbon bundles 310b on the curved segment of the deformable ribbon bundles 310a.

For example, FIG. 3C illustrates a cross-sectional design view of the optical cable 303 with a central core 315 and an adjacent concentric row 317 formed by deformable ribbon bundles 310b. The central core 315, as shown in FIG. 3C, comprise three substantially pentagonal shaped deformable ribbon bundles 310a compressed together in a substantially hexagonal shape. The adjacent concentric row 317 comprise nine sectors of deformable ribbon bundles 310b. Each of the deformable ribbon bundles 310a in the central core 315 physically contact the other deformable ribbon bundles 310a on two sides and at least three deformable ribbon bundles 310b on three sides.

For example, FIG. 3D illustrates a cross-sectional design view of the optical cable 305 with a central core 318 and an adjacent concentric row 319 formed by deformable ribbon bundles 310b. The central core 318, as shown in FIG. 3D, comprise three substantially pentagonal shaped deformable ribbon bundles 310a compressed together in a substantially octagonal shape. The adjacent concentric row 319 comprise nine sectors of deformable ribbon bundles 310b. Each of the deformable ribbon bundles 310a in the central core 318 physically contact the other deformable ribbon bundles 310a on two sides and at least three deformable ribbon bundles 310b on three side.

In particular, although for practical reasons many of these have been illustrated as circular and polygonal objects, the plurality of deformable ribbon bundles 310 are shaped irregularly due to deformation.

Figure 4A:
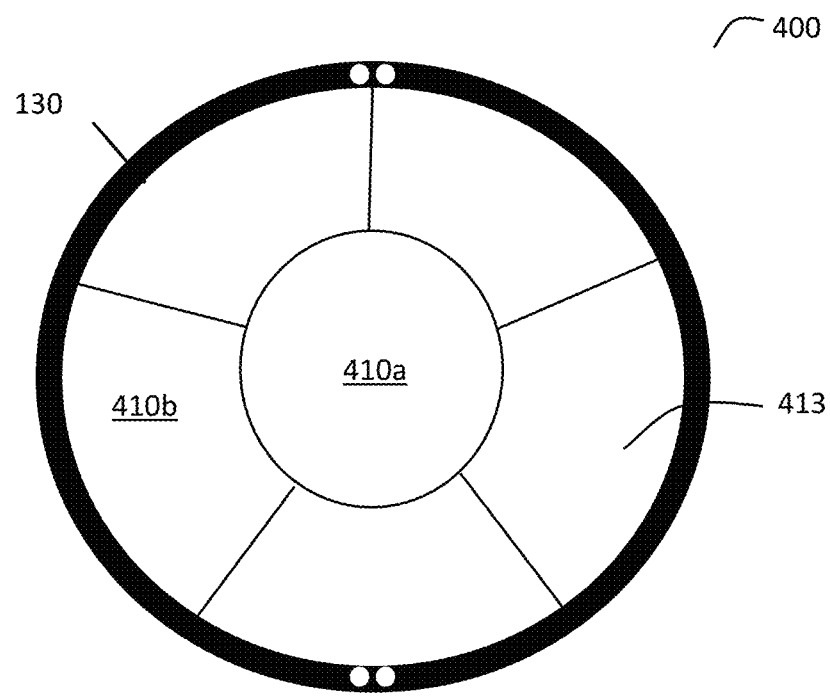
FIGS. 4A-4C illustrates configurations with a single deformable ribbon bundle in the center taking the place of a rigid central strength member in conventional cables.
Figure 4B:
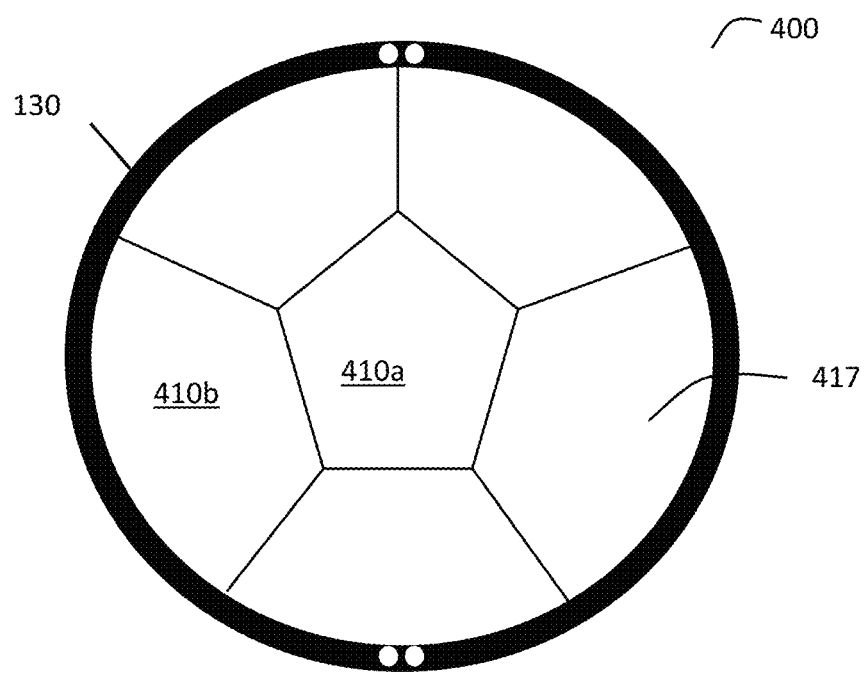
Figure 4C:
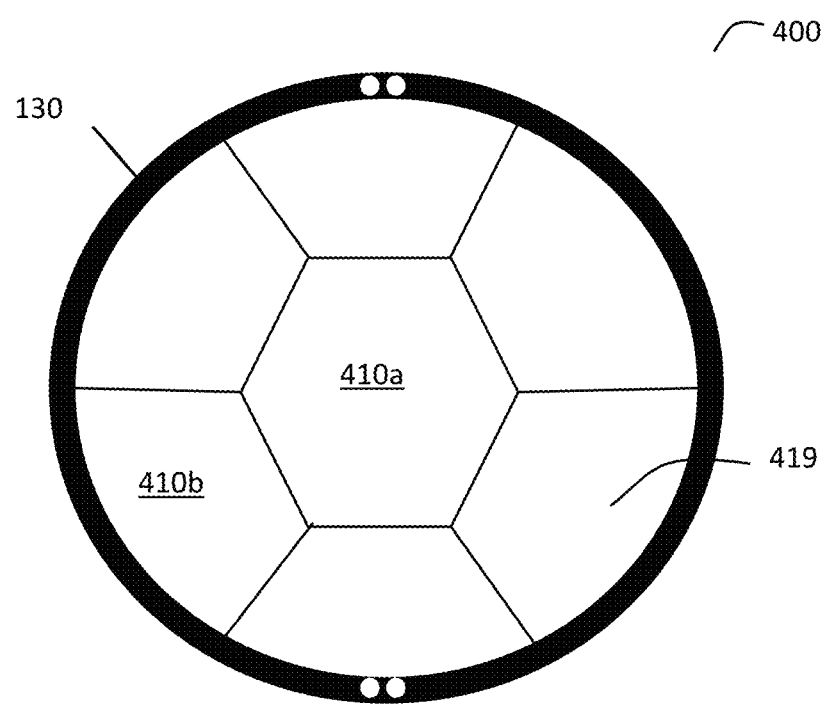

FIGS. 4A-4C illustrates configurations with a single deformable ribbon bundle in the center taking the place of a central strength member in conventional cables. The central cable can be made to be more closely packed optical fibers that get tightly held when the soft deformable material of the ribbon bundle pushes in during the extruding process. The central ribbon bundle may be larger than the peripheral ones. FIGS. 4A-4C illustrate design arrangements with alternative cross-sectional shapes of the single deformable ribbon bundles in the central core of the optical cable. The final cross-sectional shape of the single deformable ribbon bundles may be made different to fit a certain type of configuration and are not representative of the final shape.

Referring to FIGS. 4A-4C, in one or more embodiments, the optical cable comprises a central deformable ribbon bundle 410a and an adjacent concentric row of deformable ribbon bundles 410b that are formed within an outer jacket 130. The deformable ribbon bundles 410a and 410b includes the features of the plurality of deformable ribbon bundles 110 as described in FIGS. 1-2F. The central deformable ribbon bundle 410a may be formed in various shapes and sizes. Although a single deformable ribbon bundle is shown in the central region and five deformable ribbon bundles are shown in the adjacent concentric row in FIGS. 4A-4C, these numbers are not necessarily indicative of the total number of ribbon bundles 410 that will be included in the optical cable. Each deformable ribbon bundles may include the same or a different number of fibers. In particular, although for practical reasons many of these have been illustrated as circular and polygonal objects, the plurality of deformable ribbon bundles 410 are shaped irregularly due to deformation.

For example, FIG. 4A illustrates a cross-sectional design view of the optical cable 401 with a substantially circular central deformable ribbon bundle 410a and an adjacent concentric row 413 formed by deformable ribbon bundles 410b. The adjacent concentric row 413 comprise five sectors of deformable ribbon bundles 410b. The central deformable ribbon bundle 410a physically contact each deformable ribbon bundles 410b.

For example, FIG. 4B illustrates a cross-sectional design view of the optical cable 403 with a substantially pentagonal central deformable ribbon bundle 410a and an adjacent concentric row 417 formed by deformable ribbon bundles 410b. The adjacent concentric row 417 comprise five sectors of deformable ribbon bundles 410b. The pentagonal central deformable ribbon bundles 410a physically contact one deformable ribbon bundles 410b on each side of the central deformable ribbon bundle 410a.

For example, FIG. 4C illustrates a cross-sectional design view of the optical cable 405 with a substantially hexagonal central deformable ribbon bundle 410a and an adjacent concentric row 419 formed by deformable ribbon bundles 410b. The adjacent concentric row 419 comprise six sectors of deformable ribbon bundles 410b. The pentagonal central deformable ribbon bundles 410a physically contact at least one deformable ribbon bundles 410b on each side of the central deformable ribbon bundle 410a.

Figure 5:
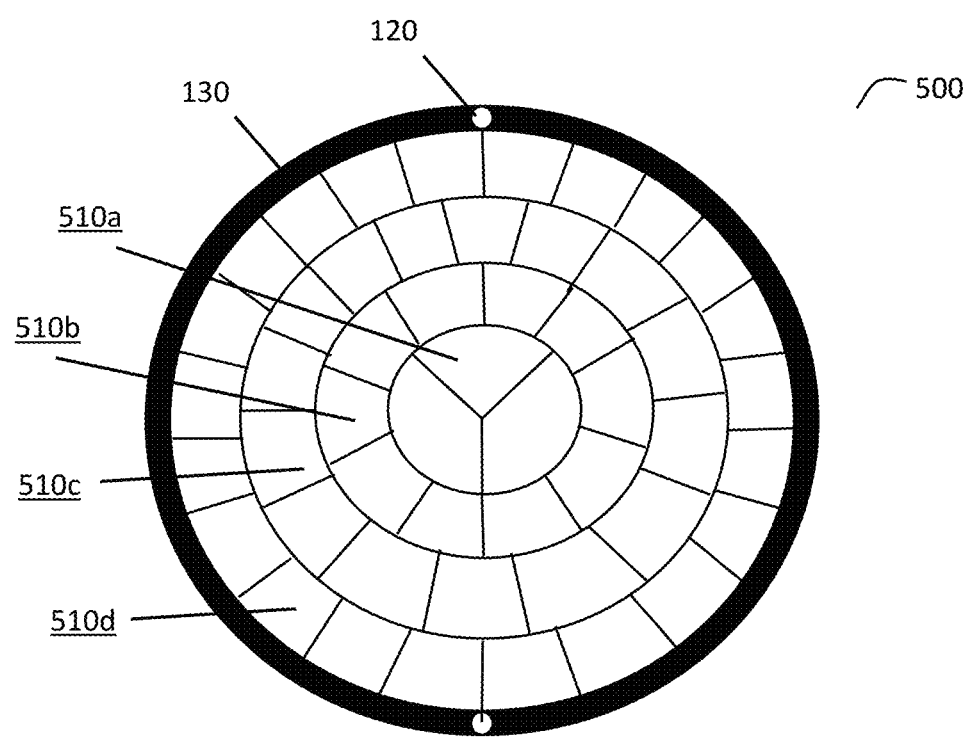
FIG. 5 illustrates a cross-sectional view of a specific design for an optical cable in accordance with an alternative embodiment of the invention.

FIG. 5 illustrates a cross-sectional view of a specific design for an optical cable in accordance with an alternative embodiment of the invention. As with FIGS. 3A-4C, FIG. 5 illustrate the design arrangement and are not representative of the final shape.

FIG. 5 illustrates an alternative design for an optical cable 500 in which the deformable ribbon bundles are arranged in multiple concentric paths around a central core of deformable ribbon bundles. The deformable ribbon bundles 510a-510d includes the features of the deformable ribbon bundles 110 as described in FIGS. 1-2F. As illustrated in FIG. 5, the multiple concentric paths comprise a first row of deformable ribbon bundles 510b arranged around the central core of deformable ribbon bundles 510a, a second row of deformable ribbon bundles 510c arranged around the first row of deformable ribbon bundles 510b, and a third row of deformable ribbon bundles 510d arranged around the second row of deformable ribbon bundles 510c. An outer jacket 130 is disposed around the multiple rows of the deformable ribbon bundles 510d. In one or more embodiment, the outer jacket 130 comprises a plurality of peripheral strength members 120. Although two peripheral strength members 120 are shown in FIG. 5, this number is not necessarily indicative of the total number of peripheral strength members 120 that will be included. In one or more embodiments, the peripheral strength member 120 may be disposed opposite to another peripheral strength members 120. The peripheral strength members 120 may be disposed adjacent to additional peripheral strength members 120. The individual ribbon bundles are similarly deformed as described in prior embodiments.

In one example of the embodiment of FIG. 5, the optical cable has a cable diameter of 36 mm with three ribbon bundles in the central core, nine ribbon bundles in the first layer, fifteen ribbon bundles in the second layer, and twenty-one ribbon bundles in the third layer. Each deformable ribbon bundle contains 288 optical fibers in which each fiber has a diameter of 200 µm. Thus, the cable of FIG. 5 includes 6912 fibers with a cable density of 6.5 fibers/mm$^2$.

Figure 6:
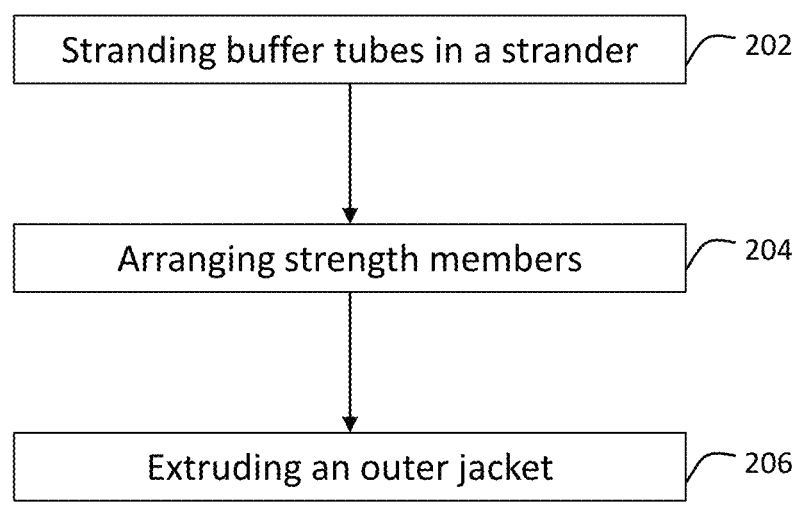
FIG. 6 illustrates a flowchart of a process for forming an optical cable in accordance with embodiments of the invention.

FIG. 6 illustrates a flowchart of a process for forming an optical cable in accordance with embodiments of the invention. The process may be used to form the optical cables described in various embodiments above.

In one or more embodiments, as illustrated in box 602, the process of forming an optical cable comprises stranding ribbon bundles in a cable strander. The cable strander may be designed to align the ribbon bundles to form a tightly packed optical cable as described in various embodiments of this disclosure. Accordingly, a first type of ribbon bundles, a second type of ribbon bundles, and a third type of ribbon bundles may be arranged using the cable strander. As described previously in various embodiments, for example, the first type of ribbon bundles comprise a first flexible ribbon, the second type of ribbon bundles comprise a second flexible ribbon, and the third type of ribbon bundles comprise a third flexible ribbon. Each of the second flexible ribbon, the second flexible ribbon, and the third flexible ribbon comprise a corresponding number of a plurality of optical fibers disposed within an associated ribbon bundle jacket made of a soft deformable material.

Referring next to box 604, strength members may be positioned around the ribbon bundles using the strander. This step is optional as some cables may not have any strength members.

Referring next to box 606, the outer jacket is extruded around the outer row of the ribbon bundles. For example, a medium-density polyethylene (MDPE) or high-density polyethylene (HDPE) may be jacketed over the bundle of ribbon bundles. The extrusion process compresses ribbon bundles together removing all intervening voids and dramatically improving the packing density. For example, during the cooling of the jacket material, the ribbon bundles may be deformed and compressed together causing the soft deformable material of the ribbon bundle jacket to deform plastically. This arranges the first type of ribbon bundles in an interlocking pattern in a central region of the optical cable and the second type of ribbon bundles and the third type of ribbon bundles around the first type of ribbon bundles in a peripheral region of the optical cable.

Optionally, when additional strength members are present during the extrusion process, the outer jacket may partially or fully embed these strength members.

Example embodiments of the present invention are summarized here. Other embodiments can also be understood from the entirety of the specification and the claims filed herein.

Example 1. An optical cable includes a first type of ribbon bundles, a second type of ribbon bundles, a third type of ribbon bundles, a plurality of strength rods, and an outer jacket. The first type of ribbon bundles includes a first flexible ribbon. The first flexible ribbon includes a first plurality of optical fibers disposed within a first ribbon bundle jacket. The first type of ribbon bundles is arranged in an interlocking pattern in a central region of the optical cable. The second type of ribbon bundles includes a second flexible ribbon. The second flexible ribbon includes a second plurality of optical fibers disposed within a second ribbon bundle jacket. The third type of ribbon bundles includes a third flexible ribbon. The third flexible ribbon includes a third plurality of optical fibers disposed within a third ribbon bundle jacket. The second type of ribbon bundles and the third type of ribbon bundles are disposed around the first type of ribbon bundles in a peripheral region of the optical cable. The outer jacket is disposed around the second and the third type of ribbon bundles, the plurality of strength rods being at least partially embedded in the outer jacket, where the cumulative cross-sectional area of all of the strength rods in the cable divided by the cumulative cross-sectional area of all glass parts of the optical fibers in the cable is a first value less than 0.22, and where, at a temperature between −40° C. and 0° C. and at a wavelength of 1550 nm, the attenuation increase of the optical fibers in the cable relative to 25° C. is below 0.15 dB/km.

Example 2. The optical cable of example 1, where each of the first type of ribbon bundles physically contacts with a first number of ribbon bundles from the first, the second, and the third types of ribbon bundles, where each of the second type of ribbon bundles physically contacts with a second number of ribbon bundles from the first, the second, and the third types of ribbon bundles, where each of the third type of ribbon bundles physically contacts with a third number of ribbon bundles from the first, the second, and the third types of ribbon bundles, where the first number is greater than the second number, and the second number is greater than the third number.

Example 3. The optical cable of examples 1 or 2, where each of the first type of ribbon bundles physically contacts with six other ribbon bundles from the first, the second, and the third types of ribbon bundles, where each of the second type of ribbon bundles physically contacts with four other ribbon bundles from the first, the second, and the third types of ribbon bundles, and where each of the third type of ribbon bundles physically contacts with three other ribbon bundles from the first, the second, and the third types of ribbon bundles.

Example 4. The optical cable of examples 1 to 3, where the second type of ribbon bundles have a different shape than the first type of ribbon bundles and the third type of ribbon bundles.

Example 5. The optical cable of examples 1 to 4, where the second type of ribbon bundles have a different number of optical fibers than the third type of ribbon bundles.

Example 6. The optical cable of examples 1 to 5, where the cumulative cross sectional area of the plurality of strength rods in the outer jacket divided by the cumulative cross sectional area of a polymer like material around the optical fibers, in the ribbon bundles, and in the outer jacket is less than 0.025.

Example 7. The optical cable of examples 1 to 6, where the plurality of strength rods includes a first strength rod disposed in the outer jacket and a second strength rod disposed in the outer jacket. The second strength rod is disposed opposite to the first strength rod.

Example 8. The optical cable of example 7, where the plurality of strength rods includes a third strength rod disposed in the outer jacket and a fourth strength rod disposed in the outer jacket. The third strength rod is located next to the first strength rod. The third strength rod is disposed opposite to the fourth strength rod. The fourth strength rod is located next to the second strength rod.

Example 9. The optical cable of examples 1 to 7, where the first strength rod and the second strength rod are embedded fully within the outer jacket.

Example 10. The optical cable of examples 1 to 7, where the first strength rod is partially embedded within the outer jacket and includes an outer surface physically contacting one of the second or third type of ribbon bundles.

Example 11. The optical cable of examples 1 to 10, where each of the first type of ribbon bundles further includes a first plurality of flexible ribbons disposed within the first ribbon bundle jacket, where each of the second type of ribbon bundles further includes a second plurality of flexible ribbons disposed within the second ribbon bundle jacket, and where each of the third type of ribbon bundles further includes a third plurality of flexible ribbons disposed within the third ribbon bundle jacket.

Example 12. The optical cable of examples 1 to 11, where one or more of the second type of ribbon bundles are disposed between adjacent ones of the third type of ribbon bundles.

Example 13. The optical cable of examples 1 to 12, where the first type of ribbon bundles, the second type of ribbon bundles, and the third type of ribbon bundles together includes more than 1700 optical fibers and where the cable has a core fiber density greater than 10 fibers/mm$^2$.

Example 14. The optical cable of examples 1 to 13, where each of the first, the second, and the third flexible ribbons includes 12 or more optical fibers that are intermittently bonded to neighboring fibers.

Example 15. The optical cable of examples 1 to 14, where each of the first, the second, and the third ribbon bundle jacket include a thermoplastic flexible material. The flexible material includes a thickness between 0.05 mm and 0.3 mm.

Example 16. The optical cable of examples 1 to 15, where the elastic modulus of each of the first, the second, and the third ribbon bundle jacket is between 1000 psi and 4000 psi.

Example 17. The optical cable of examples 1 to 16, where the cable stiffness of the optical cable is greater than 60 N/cm.

Example 18. A method of forming an optical cable includes stranding a first type of ribbon bundles, a second type of ribbon bundles, and a third type of ribbon bundles in a strander, the first type of ribbon bundles comprising a first flexible ribbon comprising a first plurality of optical fibers disposed within a first ribbon bundle jacket; the second type of ribbon bundles comprising a second flexible ribbon comprising a second plurality of optical fibers disposed within a second ribbon bundle jacket; the third type of ribbon bundles comprising a third flexible ribbon comprising a third plurality of optical fibers disposed within a third ribbon bundle jacket, each of the first, the second, and the third ribbon bundle jacket comprising a soft deformable material. The method further includes extruding an outer jacket around the second and the third type of ribbon bundles, the extruding arranging the first type of ribbon bundles in an interlocking pattern in a central region of the optical cable and the second type of ribbon bundles and the third type of ribbon bundles around the first type of ribbon bundles in a peripheral region of the optical cable.

Example 19. The method of example 18, further includes arranging a first strength rod and a second strength rod around the second type and the third type of ribbon bundles. The outer jacket being formed to encapsulate at least partially the first and the second strength rods.

Example 20. A high fiber density optical cable includes a cable core. The high density optical cable includes more than 1700 optical fibers, where the fibers are arranged in flexible ribbons in a non-planar configuration. Each flexible ribbon comprises 12 or more optical fibers that are intermittently bonded to neighboring fibers, where the flexible ribbons are grouped in 5 or more ribbon bundle. Each ribbon bundle includes a soft deformable bundle jacket completely surrounding flexible ribbon bundle, where the cable has a core fiber density of 10 optical fibers/mm² or more. An outer jacket surrounds the cable core, where the outer jacket material at least partially embeds at least two strength rods, and surrounds the cable core, where the cumulative cross-sectional area of all of the at least two strength rods in the cable divided by the cumulative cross-sectional area of all glass parts of the optical fibers in the cable is a first value less than 0.22, and where at a temperature between −40° C. and 0° C. and at a wavelength of 1550 nm, the attenuation increase of the optical fibers in the cable relative to 25° C. is below 0.15 dB/km.

Example 21. The optical cable of example 20, where the strength rods comprise metallic elements, glass reinforced composite rods, aramid reinforced composite rods or carbon fiber reinforced composite rods.

Example 22. The optical cable of examples 20 or 21, where the soft deformable bundle jacket includes a thermoplastic flexible material. The thermoplastic flexible material includes a thickness between 0.05 mm and 0.3 mm.

Example 23. The optical cable of examples 20 to 22, where the elastic modulus of the bundle jacket is between 1000 psi and 4000 psi.

Example 24. The optical cable of examples 20 to 23, where the cumulative cross sectional area of the strength rods in the outer jacket divided by the cumulative cross sectional area of a polymer like material around the optical fibers, in the ribbon bundles, and in the outer jacket is less than 0.025.

Example 25. The optical cable of examples 20 to 24, where the at least two strength rods includes a first strength rod disposed in the outer jacket and a second strength rod disposed in the outer jacket. The second strength rod is disposed opposite to the first strength rod.

Example 26. The optical cable of example 25, where the at least two strength rods includes a third strength rod disposed in the outer jacket and a fourth strength rod disposed in the outer jacket. The third strength rod is located next to the first strength rod. The third strength rod is disposed opposite to the fourth strength rod. The fourth strength rod is located next to the second strength rod.

Example 27. The optical cable of example 25, where the first strength rod and the second strength rod are embedded fully within the outer jacket.

Example 28. The optical cable of example 25, where the first strength rod is partially embedded within the outer jacket.

Example 29. The optical cable of examples 20 to 28, where the ribbon bundles includes a first type of ribbon bundles arranged in an interlocking pattern in a central region of the optical cable, a second type of ribbon bundles and a third type of ribbon bundles. The second type of ribbon bundles and the third type of ribbon bundles are disposed around the first type of ribbon bundles in a peripheral region of the optical cable.

Example 30. The optical cable of examples 20 to 29, where each of the first type of ribbon bundles physically contacts with a first number of ribbon bundles from the first, the second, and the third types of ribbon bundles, where each of the second type of ribbon bundles physically contacts with a second number of ribbon bundles from the first, the second, and the third types of ribbon bundles, where each of the third type of ribbon bundles physically contacts with a third number of ribbon bundles from the first, the second, and the third types of ribbon bundles, where the first number is greater than the second number, and the second number is greater than the third number.

Example 31. The optical cable of examples 20 to 29, where each of the first type of ribbon bundles physically contacts with six other ribbon bundles from the first, the second, and the third types of ribbon bundles, where each of the second type of ribbon bundles physically contacts with four other ribbon bundles from the first, the second, and the third types of ribbon bundles, and where each of the third type of ribbon bundles physically contacts with three other ribbon bundles from the first, the second, and the third types of ribbon bundles.

Example 32. The optical cable of examples 20 to 29, where the second type of ribbon bundles have a different shape than the first type of ribbon bundles and the third type of ribbon bundles.

Example 33. The optical cable of examples 20 to 29, where the second type of ribbon bundles have a different number of optical fibers than the third type of ribbon bundles.

Example 34. The optical cable of examples 20 to 29, where one or more of the second type of ribbon bundles are disposed between adjacent ones of the third type of ribbon bundles.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An optical cable comprising:
   a first type of ribbon bundles comprising a first flexible ribbon comprising a first plurality of optical fibers disposed within a first ribbon bundle jacket, the first type of ribbon bundles arranged in an interlocking pattern in a central region of the optical cable, wherein each of the first type of ribbon bundles physically contacts with at least one other ribbon bundle from the first type of ribbon bundles;
   a second type of ribbon bundles comprising a second flexible ribbon comprising a second plurality of optical fibers disposed within a second ribbon bundle jacket, wherein each of the second type of ribbon bundles physically contacts with at least one other ribbon bundle from the first type of ribbon bundles;
   a third type of ribbon bundles comprising a third flexible ribbon comprising a third plurality of optical fibers disposed within a third ribbon bundle jacket, the second type of ribbon bundles and the third type of ribbon bundles disposed around the first type of ribbon bundles in a peripheral region of the optical cable, wherein each of the third type of ribbon bundles physically contacts with at least one other ribbon bundle from the first type of ribbon bundles;
   a plurality of strength rods; and
   an outer jacket disposed around the second and the third type of ribbon bundles, the plurality of strength rods being at least partially embedded in the outer jacket, wherein a cumulative cross-sectional area of all of the strength rods in the cable divided by a cumulative cross-sectional area of all glass parts of the optical fibers in the cable is a first value less than 0.22, wherein, at a temperature between −40° C. and 0° C. and at a wavelength of 1550 nm, the attenuation increase of the optical fibers in the cable relative to 25° C. is below 0.15 dB/km.

2. The optical cable according to claim 1, wherein each of the first type of ribbon bundles physically contacts with a first number of ribbon bundles from the first, the second, and the third types of ribbon bundles, wherein each of the second type of ribbon bundles physically contacts with a second number of ribbon bundles from the first, the second, and the third types of ribbon bundles, wherein each of the third type of ribbon bundles physically contacts with a third number of ribbon bundles from the first, the second, and the third types of ribbon bundles, wherein the first number is greater than the second number, and the second number is greater than the third number.

3. The optical cable according to claim 1, wherein each of the first type of ribbon bundles physically contacts with six other ribbon bundles from the first, the second, and the third types of ribbon bundles, wherein each of the second type of ribbon bundles physically contacts with four other ribbon bundles from the first, the second, and the third types of ribbon bundles, and wherein each of the third type of ribbon bundles physically contacts with three other ribbon bundles from the first, the second, and the third types of ribbon bundles.

4. The optical cable according to claim 1, wherein the second type of ribbon bundles have a different shape than the first type of ribbon bundles and the third type of ribbon bundles.

5. The optical cable according to claim 1, wherein the second type of ribbon bundles have a different number of optical fibers than the third type of ribbon bundles.

6. The optical cable according to claim 1, wherein the cumulative cross-sectional area of the plurality of strength rods in the outer jacket divided by the cumulative cross-sectional area of a polymer-like material around the optical fibers, in the ribbon bundles, and in the outer jacket is less than 0.025.

7. The optical cable according to claim 1, wherein the plurality of strength rods comprise:
   a first strength rod disposed in the outer jacket; and
   a second strength rod disposed in the outer jacket, the second strength rod disposed opposite to the first strength rod.

8. The optical cable according to claim 7, wherein the plurality of strength rods comprise:
   a third strength rod disposed in the outer jacket, the third strength rod located next to the first strength rod; and
   a fourth strength rod disposed in the outer jacket, the third strength rod disposed opposite to the fourth strength rod, the fourth strength rod located next to the second strength rod.

9. The optical cable according to claim 7, wherein the first strength rod and the second strength rod are embedded fully within the outer jacket.

10. The optical cable according to claim 7, wherein the first strength rod is partially embedded within the outer jacket and comprises an outer surface physically contacting one of the second or third type of ribbon bundles.

11. The optical cable according to claim 1, wherein each of the first type of ribbon bundles further comprise a first plurality of flexible ribbons disposed within the first ribbon bundle jacket, wherein each of the second type of ribbon bundles further comprise a second plurality of flexible ribbons disposed within the second ribbon bundle jacket, and wherein each of the third type of ribbon bundles further comprise a third plurality of flexible ribbons disposed within the third ribbon bundle jacket.

12. The optical cable according to claim 1, wherein one or more of the second type of ribbon bundles are disposed between adjacent ones of the third type of ribbon bundles.

13. The optical cable according to claim 1, wherein the first type of ribbon bundles, the second type of ribbon bundles, and the third type of ribbon bundles together comprise more than 1700 optical fibers and wherein the cable has a core fiber density greater than 10 fibers/mm$^2$.

14. The optical cable according to claim 1, wherein each of the first, the second, and the third flexible ribbons comprises 12 or more optical fibers that are intermittently bonded to neighboring fibers.

15. The optical cable according to claim 1, wherein each of the first, the second, and the third ribbon bundle jacket comprises a thermoplastic flexible material comprising a thickness between 0.05 mm and 0.3 mm.

16. The optical cable according to claim 1, wherein an elastic modulus of each of the first, the second, and the third ribbon bundle jacket is between 1000 psi and 4000 psi.

17. The optical cable according to claim 1, wherein the cable stiffness of the optical cable is greater than 60 N/cm.

18. A high fiber density optical cable comprising:
- a cable core comprising more than 1700 optical fibers, wherein the fibers are arranged in flexible ribbons in a non-planar configuration, each flexible ribbon comprises 12 or more optical fibers that are intermittently bonded to neighboring fibers, wherein the flexible ribbons are grouped in 5 or more ribbon bundles, each ribbon bundle comprising a soft deformable bundle jacket completely surrounding the ribbon bundle, wherein the ribbon bundles comprise a first type of ribbon bundles in a central region, a second type of ribbon bundles, and a third type of ribbon bundles, the second and the third type of ribbon bundles disposed around the first type of ribbon bundles, wherein each of the first type of ribbon bundles physically contacts with at least one other ribbon bundle from each of the first, the second, and the third types of ribbon bundles, and wherein the cable has a core fiber density of 10 optical fibers/mm$^2$ or more; and
- an outer jacket surrounding the cable core, wherein the outer jacket at least partially embeds at least two strength rods, wherein a cumulative cross-sectional area of all of the at least two strength rods in the cable divided by a cumulative cross-sectional area of all glass parts of the optical fibers in the cable is a first value less than 0.22, and wherein, at a temperature between −40° C. and 0° C. and at a wavelength of 1550 nm, the attenuation increase of the optical fibers relative to 25° C. is below 0.15 dB/km.

19. An optical cable comprising:
- a first type of ribbon bundles comprising a first flexible ribbon comprising a first plurality of optical fibers disposed within a first ribbon bundle jacket, the first type of ribbon bundles arranged in an interlocking pattern in a central region of the optical cable;
- a second type of ribbon bundles comprising a second flexible ribbon comprising a second plurality of optical fibers disposed within a second ribbon bundle jacket;
- a third type of ribbon bundles comprising a third flexible ribbon comprising a third plurality of optical fibers disposed within a third ribbon bundle jacket, the second type of ribbon bundles and the third type of ribbon bundles disposed around the first type of ribbon bundles in a peripheral region of the optical cable;
- a plurality of strength rods; and
- an outer jacket disposed around the second and the third type of ribbon bundles, the plurality of strength rods being at least partially embedded in the outer jacket, wherein a cumulative cross-sectional area of all of the strength rods in the cable divided by a cumulative cross-sectional area of all glass parts of the optical fibers in the cable is a first value less than 0.22, and wherein, at a temperature between −40° C. and 0° C. and at a wavelength of 1550 nm, the attenuation increase of the optical fibers in the cable relative to 25° C. is below 0.15 dB/km, wherein each of the first type of ribbon bundles physically contacts with at least one other ribbon bundle from each of the first, the second, and the third types of ribbon bundles.

20. The optical cable according to claim 19, wherein each of the first type of ribbon bundle physically contacts with six other ribbon bundles from the first, the second, and the third types of ribbon bundles.

21. The optical cable according to claim 20, wherein each of the second type of ribbon bundles physically contacts with four other ribbon bundles from the first, the second, and the third types of ribbon bundles.

22. The optical cable according to claim 21, wherein each of the third type of ribbon bundles physically contacts with three other ribbon bundles from the first, the second, and the third types of ribbon bundles.

\* \* \* \* \*